(12) United States Patent
Yanase et al.

(10) Patent No.: US 8,614,024 B2
(45) Date of Patent: Dec. 24, 2013

(54) POWER SUPPLY APPARATUS

(75) Inventors: Norimasa Yanase, Chiba (JP); Noboru Ishisone, Chiba (JP); Tsuneaki Tamachi, Chiba (JP); Toru Ozaki, Chiba (JP); Takafumi Sarata, Chiba (JP); Kazutaka Yuzurihara, Chiba (JP); Fumiharu Iwasaki, Chiba (JP)

(73) Assignee: Seiko Instruments Inc. (JP)

( * ) Notice: Subject to any disclaimer, the term of this patent is extended or adjusted under 35 U.S.C. 154(b) by 503 days.

(21) Appl. No.: 12/451,692

(22) PCT Filed: May 29, 2008

(86) PCT No.: PCT/JP2008/059875
§ 371 (c)(1),
(2), (4) Date: Nov. 24, 2009

(87) PCT Pub. No.: WO2009/008227
PCT Pub. Date: Jan. 15, 2009

(65) Prior Publication Data
US 2010/0136449 A1 Jun. 3, 2010

(30) Foreign Application Priority Data
Jul. 10, 2007 (JP) .................................. 2007-181267

(51) Int. Cl.
*H01M 8/04* (2006.01)
(52) U.S. Cl.
USPC ............................. 429/432; 429/428; 429/430
(58) Field of Classification Search
USPC .......................................... 429/429, 430–432
See application file for complete search history.

(56) References Cited

U.S. PATENT DOCUMENTS 6,140,820 A * 10/2000 James ........................... 324/434
7,419,734 B2 * 9/2008 Pearson ........................ 429/431

FOREIGN PATENT DOCUMENTS

| JP | 02226665 | 9/1990 |
|---|---|---|
| JP | 2003163017 | 6/2003 |
| JP | 2003209932 | 7/2003 |
| JP | 2004311112 | 11/2004 |
| JP | 2006073379 | 3/2006 |
| JP | 2006114481 | 4/2006 |
| JP | 2007042501 | 2/2007 |

* cited by examiner

*Primary Examiner* — Patrick Joseph Ryan
*Assistant Examiner* — Ladan Mohaddes
(74) *Attorney, Agent, or Firm* — Adams & Wilks

(57) ABSTRACT

A power supply apparatus has a combined power source with power cells configured electrically independently. A switch arbitrarily changes connection paths of the power cells by selectively connecting terminals of the power cells through switching elements. A detector detects differences in electrical potentials between power cell terminals. An output detector detects a power consumption in a load and/or an output power of the power source. ON-OFF states of the switching elements are controlled by a control signal generated based on voltage signals representing detected differences in electrical potentials, power consumption, and output power. A connection status of each power cell is controlled so as to halt outputting of the power cell having the lowest output voltage if it is detected that a detected power value is equal to or lower than an output power preset based on a power generating capacity of the power source.

11 Claims, 4 Drawing Sheets

POWER SUPPLY APPARATUS

CROSS-REFERENCE TO RELATED APPLICATIONS

This application is a U.S. national stage application of International Application No. PCT/JP2008/059875 filed May 29, 2008, claiming a priority date of Jul. 10, 2007, and published in a non-English language.

BACKGROUND OF THE INVENTION

This invention relates to a power supply apparatus and, more specifically, to a power supply apparatus including a plurality of power cells configured electrically and independently and connected arbitrarily, for example, in series or in parallel.

BACKGROUND ART

FIG. 4 is a block diagram showing a fuel cell system according to a conventional technology (Patent Document 1). As shown in this drawing, the fuel cell system is designed to supply electric power, which has been generated in a fuel cell stack 100, to a load 109 via a power converter 103 for regulating the electric power to be a predetermined output voltage (desired voltage) designated by a controller 108.

The fuel cell stack 100 has a plurality of unit cells 110 connected in series, and each of the unit cells 110 is supplied with a fuel and air via a fuel supply device 101 and an air supply device 102. The controller 108 sets the amount of fuel supply and the amount of air supply for each unit cell 110 based on the respective voltages of the plurality of unit cells 110 measured by a voltage measuring instrument 105, allows the fuel to be supplied to each unit cell 110 via the fuel supply device 101 based on the amount of fuel supply for each unit cell 110, and allows air to be supplied to each unit cell 110 via the air supply device 102 based on the amount of air supply for each unit cell 110. The purpose of this procedure is to minimize variations in the respective voltages of the plurality of unit cells 110.

In this manner, the amount of fuel supply is increased or decreased for each unit cell 110 to stabilize the electric power generated, thereby preventing declines in the voltages of the unit cells 110 and the deterioration of each unit cell 110, due to variations in the characteristics of each unit cell 110 or variations in the supply of fuel. That is, variations in the voltages of the unit cells 110 are curtailed in an attempt to stabilize the electric power generated by the fuel cell stack 100.

Patent Document 1: JP-A-2006-73379

The above-described fuel cell system according to the conventional technology, however, has the fuel supply device 101 for each unit cell 110. This poses problems, such that 1) the structure of the apparatus is complicated, 2) the apparatus is upsized, and 3) the weight of the apparatus is increased.

Even upon control for increasing or decreasing fuel supply, there may be a case where a fall or drop in the voltage of each unit cell 110 cannot be prevented (for example, the fuel supply path is clogged, or the cell is short-circuited (physically or chemically)). In this case, the effect of stabilizing the generated electric power due to control for increasing or decreasing fuel supply is not obtained, causing the problem of wasteful fuel supply and fuel consumption.

The present invention has been accomplished in light of the above-described conventional technology. It is an object of the invention to provide a power supply apparatus which selects a power cell necessary for supplying a load power not only in a fuel cell, but also in a combined power source composed of a plurality of the power cells, has long-term reliability, and can supply electric power to the load stably.

SUMMARY OF THE INVENTION

A first aspect of the present invention for attaining the above object is a power supply apparatus, comprising:
 a combined power source composed of a plurality of power cells configured electrically independently;
 a switch, connected to the combined power source, for arbitrarily changing connection paths of the respective power cells by selectively connecting terminals of the plurality of power cells through switching elements, the switch having the same number of input terminals as the number of the terminals of the plurality of power cells and two-electrode output terminals;
 a voltage detector for respectively detecting differences in electrical potentials between the terminals of the plurality of power cells;
 a voltage regulator, connected between the combined power source and a load, for stabilizing a voltage supplied to the load;
 an output detector for detecting a power consumption in the load and/or an output power of the combined power source; and
 a controller for controlling ON-OFF states of the switching elements by controlling the switch by a control signal generated based on voltage signals representing the differences in electrical potentials detected by the voltage detector, the power consumption, and the output power of the combined power source.

A second aspect of the present invention is the power supply apparatus according to the first aspect, characterized in that
 the switch has the switching elements, whose number is equal to the number of the power cells, between the positive electrode of output ports of the switch and positive electrodes of the respective power cells; the switching elements, whose number is equal to the number of the power cells, between the negative electrode of the output ports of the switch and negative electrodes of the respective power cells; and the switching elements, whose number is smaller than the number of the power cells by one, between the power cells adjacent in a series direction of the power cells.

A third aspect of the present invention is the power supply apparatus according to the first or second aspect, characterized in that
 the controller includes processing for controlling a connection status of each of the power cells via the switch so as to halt outputting of the power cell having the lowest output voltage, if it has been detected that a power value detected by the output detector is equal to or lower than an output power preset based on output characteristics of the combined power source.

A fourth aspect of the present invention is the power supply apparatus according to the first or second aspect, characterized in that
 the controller includes processing for controlling a connection status of each of the power cells via the switch so as to halt outputting of the power cell having the lowest output voltage, when a continuous outputting time of each of the power cells becomes a predetermined time or longer, if it has been detected that a power value detected by the output detector is equal to or lower than an output power preset based on output characteristics of the combined power source.

A fifth aspect of the present invention is the power supply apparatus according to the first or second aspect, characterized in that the controller includes processing for controlling a connection status of each of the power cells via the switch so as to halt outputting of the plurality of power cells in order of increasing output voltage, when a continuous outputting time of each of the power cells becomes a predetermined time or longer, if it has been detected that a power value detected by the output detector is equal to or lower than an output power preset based on output characteristics of the combined power source.

A sixth aspect of the present invention is the power supply apparatus according to the first or second aspect, characterized in that the controller includes processing for controlling a connection status of each of the power cells via the switch so as to halt outputting of the power cell having the lowest output voltage and resume outputting of the power cell whose outputting has been halted until then, when a continuous outputting time of each of the power cells becomes a predetermined time or longer, if it has been detected that a power value detected by the output detector is equal to or lower than an output power preset based on output characteristics of the combined power source.

A seventh aspect of the present invention is the power supply apparatus according to any one of the first to sixth aspects, characterized in that the output detector detects the power consumption based on an output voltage of the voltage regulator and a load current supplied to the load.

An eighth aspect of the present invention is the power supply apparatus according to any one of the first to seventh aspects, characterized in that the voltage detector connects output ports of the respective power cells to a multiplexer, sequentially switches and scans the power cells, whose voltages are to be detected, by a control signal of the controller, and connects a voltage detecting instrument to an output port of the multiplexer to supply the voltage signals of the respective power cells sequentially to the controller.

According to the present invention, the plurality of power cells are configured electrically independently, and the terminals of the plurality of power cells can be selectively connected by the switching elements. Thus, it is easy to combine the power cells in accordance with the load. Consequently, 1) stabilization of power supply by the power supply apparatus, 2) enhancement of long-term reliability of the power cells, and 3) long life of the power supply apparatus can be realized at the same time. The provision of the cells at rest, in particular, renders a long-term continuous operation possible. From this aspect as well, reliability can be increased. That is, load distribution among the plurality of power cells, stable power supply, and long life of the combined power source can be achieved.

Figure 1:
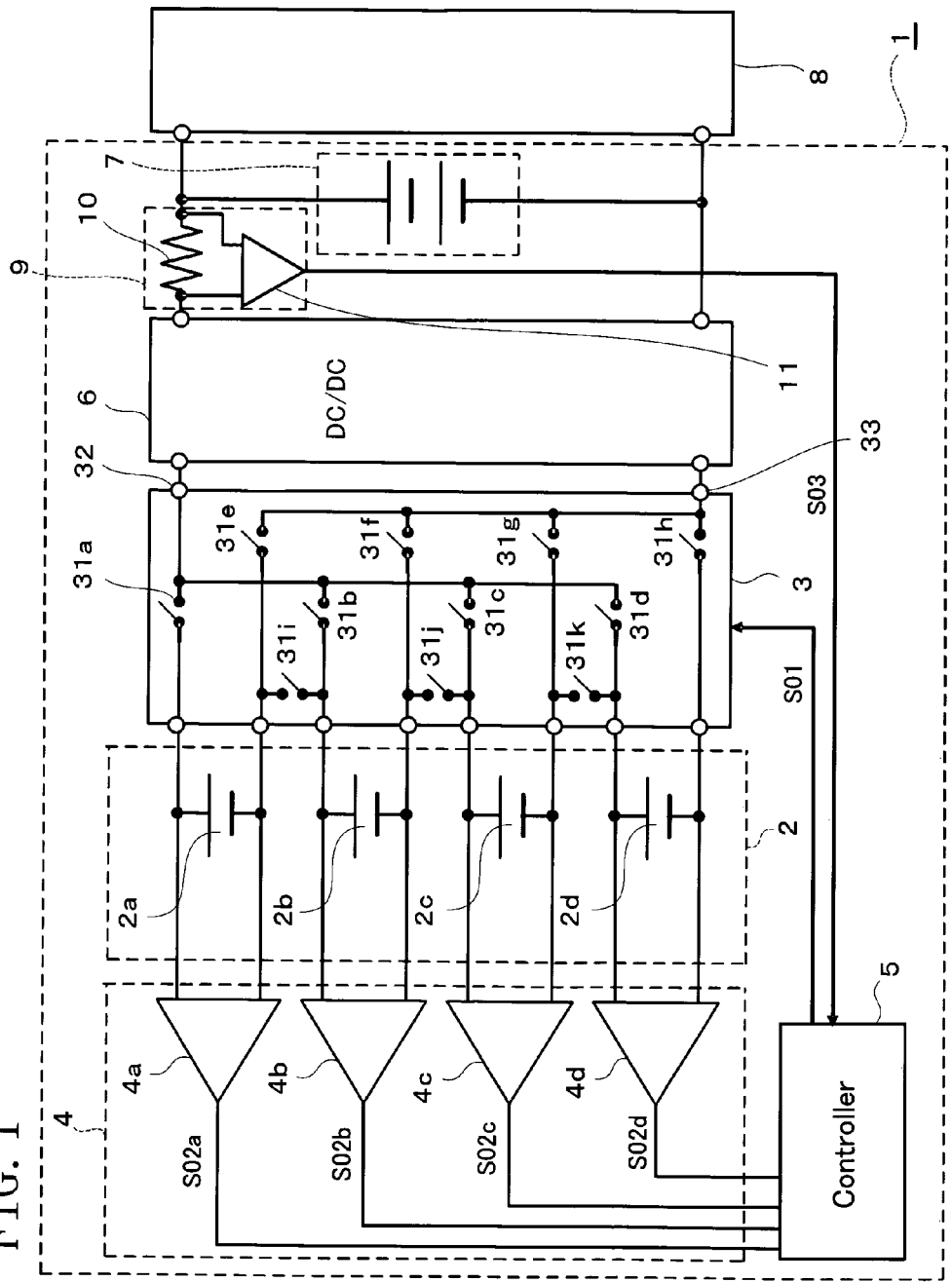
FIG. 1 is a block diagram showing a power supply apparatus according to a first embodiment of the present invention.

DESCRIPTION OF THE NUMERALS AND SYMBOLS 1, 21 Power supply apparatus
2 Fuel cell
2a to 2d Power generation cell
3 Switch
4, 41 Voltage detector
5, 51 Controller
6 Voltage regulator
8 Load
9 Current detector
31a to 31k Switching element
32, 33 Output port
42 Analog multiplexer
S01, S04 Control signal
S02a to S02d Voltage signal
S03 Load current signal

DETAILED DESCRIPTION OF THE PREFERRED EMBODIMENTS

Embodiments of the present invention will now be described in detail based on the accompanying drawings.

First Embodiment

FIG. 1 is a block diagram showing a power supply apparatus according to a first embodiment of the present invention. As shown in the drawing, a power supply apparatus 1 according to the present embodiment has a fuel cell 2 equipped with power generation cells 2a, 2b, 2c, 2d as a plurality of power cells; a switch 3 for switching, as appropriate, the terminals of the power generation cells 2a to 2d and connecting them; a voltage detector 4 for measuring voltages between the terminals of the power generation cells 2a to 2d; a controller 5 for exercising control for changing connection paths of the switch 3 based on output signals of the voltage detector 4 and a current detector 9; a voltage regulator 6 for stabilizing a voltage supplied to a load 8; a charge and discharge device 7 capable of electrical charging and discharging; and a current detector 9 composed of a current detecting amplifier 11 for detecting a load current.

In further detail, the power generation cells 2a to 2d are adapted to generate power upon supply of fuel from a fuel supply device (not shown), and the power generation cells 2a to 2d are configured electrically independently. Here, the term "configured electrically independently" refers to a state in which the power generation cells 2a to 2d are not directly connected to each other, but are necessarily connected via the switch 3.

The power generation cells 2a to 2d in the present embodiment are each composed of a polymer electrolyte fuel cell (PEFC) which generates power by supplying hydrogen, as a fuel, to an anode (negative electrode) and oxygen (air) to a cathode (positive electrode). The power generation cells 2a to 2d used here are four power generation cells each of which obtains a maximum output of 1.08 [W] when its output voltage is 0.45 [V]. The standard operating voltage of each of the power generation cells 2a to 2d is 0.6 V, and this voltage is the lower-limit operating voltage for each of the power generation cells 2a to 2d. The standard voltage is set within a voltage range where a marked diffusion overvoltage is not observed in the power generation characteristics of the power generation cells 2a to 2d and, in the case of PEFC, it is set to be between about 0.3 and 0.8 V. On this occasion, the standard output power of each of the power generation cells 2a to 2d is 0.72 [W] (hereinafter, this output power will be referred to simply as "P1"). Thus, when these four power generation cells 2a to 2d produce power, an output of 0.72 [W] X 4=2.88 [W] (hereinafter, this output power will be referred to simply as "P4") is obtained. When three of the power generation cells 2a to 2d produce power, an output of 0.72 [W]×3=2.16 [W] (hereinafter, this output power will be referred to simply as "P3") is obtained. When two of the power generation cells 2a to 2d produce power, an output of 0.72 [W]×2=1.44 [W] (hereinafter, this output power will be referred to simply as "P2") is obtained. In the present embodiment, therefore, P1, P2, P3 and P4, which are the output powers obtained by multiplying the above standard output power by the numbers of the power generation cells 2a to 2d, are respectively "the output powers preset based on the power generation characteristics of the fuel cell 2".

The power generation cells 2a to 2d may each be a direct methanol fuel cell (DMFC) using methanol as a fuel supplied to the negative electrode, a solid oxide fuel cell (SOFC), a molten carbonate fuel cell (MCFC), or a fuel cell of other type. Moreover, the number of the power generation cells 2a to 2d is not limited to four, but can be a number set as required.

Instead of the power generation cells, there can be used a plurality of power cells of different types or the same type, for example, primary cells such as manganese dry cells, alkaline manganese oxide dry cells, nickel type dry cells, alkaline button cells, silver oxide cells, lithium manganese dioxide cells, lithium thionyl chloride cells, and air zinc cells; secondary cells capable of repeated charging and discharging, typified by lead storage batteries, nickel-hydrogen secondary cells, lithium ion secondary cells, and sodium-sulfur cells; condensers which accumulate electric charge and electrostatic energy upon application of voltage to obtain electric capacity, such as condensers, capacitors, and electric double layer condensers; solar cells; and thermoelectromotive force batteries. These power cells may be connected arbitrarily, for example, in series or in parallel, to constitute the fuel cell 2.

The switch 3 is composed of a plurality of (eleven in the present embodiment) switching elements 31a to 31k. The switching elements 31a to 31k include first, second and third switching elements connected, respectively, between an output port 32 on the positive side of the switch 3 and the positive electrodes of the power generation cells 2a to 2d, between an output port 33 on the negative side of the switch 3 and the negative electrodes of the power generation cells 2a to 2d, and between the power generation cells (2a and 2b), (2b and 2c), and (2c and 2d) adjacent in the series direction. That is, the first switching elements 31a to 31d, whose number is equal to the number of the power generation cells 2a to 2d, are connected between the output port 32 on the positive side and the positive electrodes of the power generation cells 2a to 2d. The second switching elements 31e to 31h, whose number is equal to the number of the power generation cells 2a to 2d, are connected between the output port 33 on the negative side and the negative electrodes of the power generation cells 2a to 2d. The third switching elements 31i to 31k, whose number is smaller than the number of the power generation cells 2a to 2d by one, are connected between the power generation cells (2a and 2b) to (2c and 2d) adjacent in the series direction.

As a result, the power generation cells 2a to 2d can be connected arbitrarily depending on the ON-OFF states of the switching elements 31a to 31k of the switch 3. That is, the power generation cells 2a to 2d can be connected to each other in series, or connected to each other in parallel. Alternatively, the power generation cells 2a to 2d connected in series can be connected in parallel.

The switching elements 31a to 31k in the present embodiment are composed of MOS-FETs which are field effect transistors. The switching elements 31a to 31k can be composed of relay elements, transistor elements, TTL elements, C-MOS elements, and ECL elements as well as MOS-FETs. That is, any elements having a switching function can be used without limitation.

The ON-OFF states of the switching elements 31a to 31k are controlled by a control signal S01 which is the output signal of the controller 5.

The voltage detector 4 has voltage detecting amplifiers 4a, 4b, 4c, 4d connected between both electrodes of the power generation cells 2a to 2d. The voltage detector 4 converts differential input voltages from the power generation cells 2a to 2d into voltage signals S02a, S02b, S02c, S02d, which are single-ended signals with reference to the potential at the negative terminal of the charge and discharge device 7, and supplies these voltage signals to the controller 5.

The controller 5 is composed of a microcomputer. The microcomputer has programs written thereinto for taking in the voltage signals S02a to S02d from the voltage detector 4 and a load current signal S03 from the current detector 9 to control the selection of the ON-OFF states of the switching elements 31a to 31k in the switch 3 based on an internal clock.

The voltage regulator 6 adjusts an output voltage produced by the fuel cell 2 via the switch 3 to a predetermined voltage, and can be preferably composed of a DC-DC converter. Generally, the voltage regulator 6 may be a device which regulates a direct-current voltage inputted into the voltage regulator 6, and outputs a stabilized direct-current voltage. Depending on the load 8, the voltage regulator 6 may be a device for outputting an alternating-current voltage. A DC-AC converter (inverter) is known as a voltage regulator for outputting a stabilized alternating-current voltage.

The DC-DC converter may be one which can convert the direct-current voltage of the fuel cell 2 into a direct-current voltage not impeding the action of the load 8, and can supply power to the load 8. More preferably, the voltage supplied to the load 8 is stabili zed and constant. The type of the DC-DC converter is, for example, a series regulator, a switching regulator, a charge pump, or a switched capacitor. Similarly, the DC-AC converter may be one which can convert the direct-current voltage of the fuel cell 2 into an alternating-current voltage not impeding the action of the load 8, and can supply power to the load 8.

In the present embodiment, a step-up and step-down synchronous rectifying switching regulator is used as the voltage regulator 6, and its output voltage is set at 7.4 V.

The charge and discharge device 7 can be preferably composed of a secondary battery capable of repeated charging and discharging, typified by a lead storage battery, a nickel-hydrogen secondary battery, or a lithium ion secondary battery; or a condenser which accumulates electric charge and electrostatic energy upon application of a voltage to obtain electric capacity, such as a condenser, a capacitor, or an electric double layer condenser. Preferred as the secondary battery is a battery which does not exhibit a memory effect as done by a nickel-cadmium secondary battery. It is also possible to select the type of a suitable secondary battery or condenser according to the operating voltage, the minimum operating voltage, the load characteristics, etc. of the load 8 and, if necessary, connect the secondary batteries or the condensers in series, thereby adjusting the voltage supplied to the load 8. The charge and discharge device 7 in the present embodiment is composed of two lithium ion secondary batteries connected in series. The capacity of the charge and discharge device 7 is 400 mAh.

The current detector 9 in the present embodiment has a shunt resistor 10, through which a load current supplied to the load 8 flows via the voltage regulator 6, and the current detecting amplifier 11 for detecting the load current via the voltage between both ends of the shunt resistor 10, in order to detect the output power of the fuel cell 2. That is, the load current signal S03 representing the load current is entered into the controller 5, whereby a predetermined computation is performed in the controller 5 based on the output voltage value set by the voltage regulator 6 or the output voltage value detected at the output port of the voltage regulator 6, and the load current value represented by the load current signal S03, to thereby determine the power consumption of the load 8.

The detection of the power consumption of the load 8 (output value of the fuel cell 2) is not limited to the above-mentioned computation in the controller 5. Generally, there may be used for the detection an output detector which can detect the power consumption the load 8. Thus, a wattmeter for directly detecting the power consumption (output power) is also included. In order to detect the output power of the fuel cell 2, moreover, the current detector 9 may be disposed on the path of current supplied to the voltage regulator 6 via the switch 3.

The load 8 connected to the power supply apparatus 1 is an electric or electronic instrument. In the present embodiment, an electronic load device whose load 8 can be varied arbitrarily is connected to the power supply apparatus 1.

Figure 2:
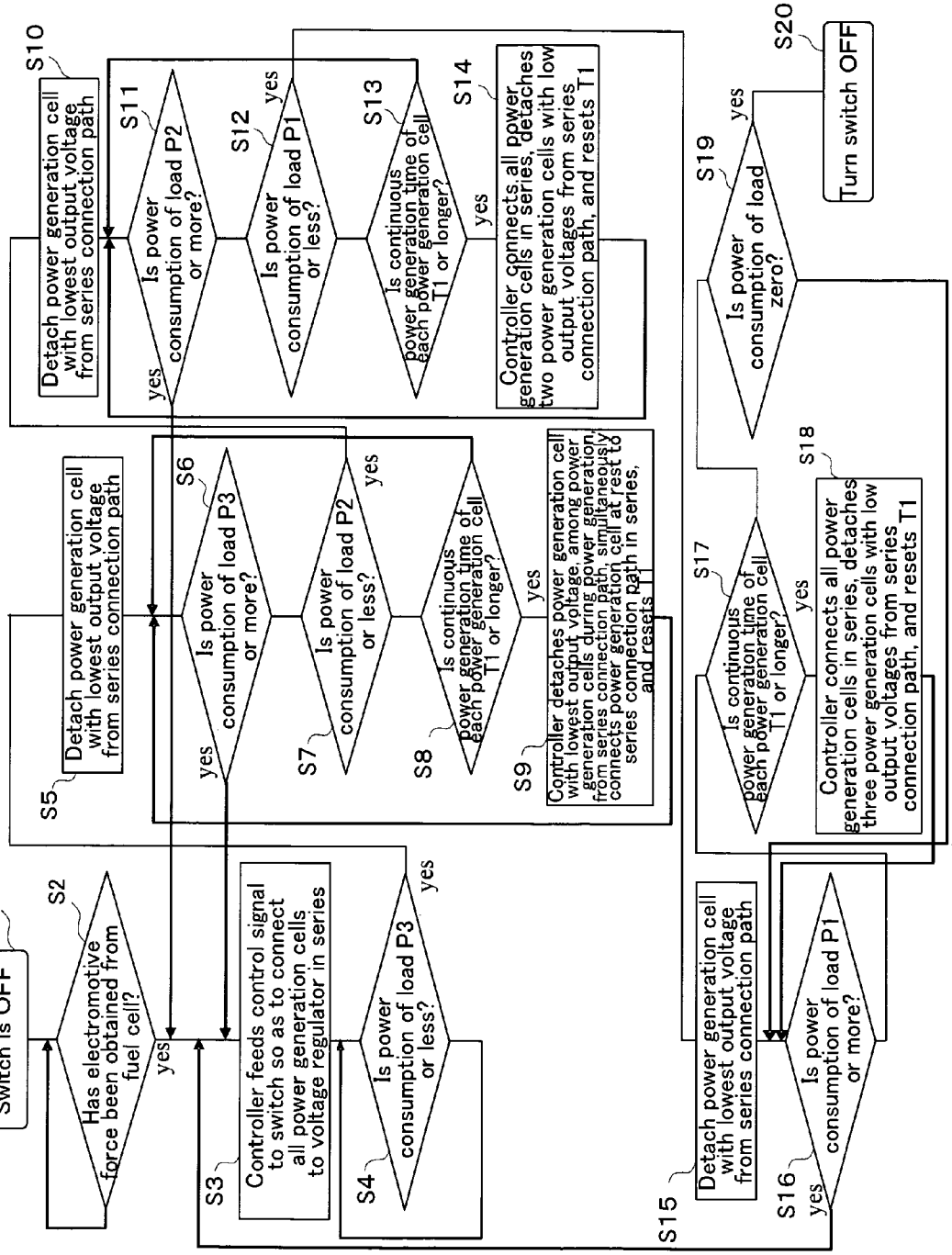
FIG. 2 is a flow chart showing a control procedure in a controller of the power supply apparatus shown in FIG. 1.

FIG. 2 is a flow chart showing the control procedure in the controller 5 of the power supply apparatus 1 shown in FIG. 1. In the present embodiment, control is exercised such that depending on the output status of the power generation cells 2a to 2d, the connection states of the switching elements 31a to 31k are changed, as appropriate, to change the number of the power generation cells 2a to 2d caused to generate power (output), and power generation in the power generation cells 2a to 2d is brought to a halt, as appropriate, depending on the elapsed time after initiation of power generation. Concretely, the control procedure is as follows:

1) When no fuel is supplied to the power generation cells 2a to 2d, the switching elements 31a to 31k of the switch 3 are all in the OFF state where no electricity flows (see Step S1).

2) When a fuel is supplied to the fuel cell 2, and the voltage detector 4 detects that an electromotive force has been obtained from the power generation cells 2a to 2d, the voltage signals S02a to S02d are entered into the controller 5 (see Step S2). The controller 5 feeds the control signal S01, which brings the switching elements 31i, 31j, 31k and the switching elements 31a, 31h of the switch 3 into the ON state, to the switch 3 in order to connect all of the power generation cells 2a to 2d in series (see Step S3).

3) It is determined whether the power consumption of the load 8 computed by the controller 5 is P3 or less (see Step S4).

4) If the result of the computation is not P3 or less upon processing in Step S4, the program is returned to the processing in Step S4, and the processing in Step S4 is repeated, until the result becomes P3 or less.

5) If the processing in Step S4 shows the power consumption of the load 8 to be P3 or less, any one of the power generation cells 2a to 2d may be at rest. Thus, the one of the power generation cells 2a to 2d that has the lowest output voltage of the power generation cells 2a to 2d based on the voltage signals S02a to S02d is detached from the series connection path (see Step S5).

6) It is determined whether the power consumption of the load 8 computed by the controller 5 is P3 or more and, if the result of the computation is P3 or more, the program is returned to the processing in Step S3 (see Step S6).

7) If it is determined, upon processing in Step S6, that the power consumption of the load 8 is less than P3, it is further determined whether the power consumption of the load 8 computed by the controller 5 is P2 or less (see Step S7).

8) If the result of computation is not P2 or less upon processing in Step S7, it is determined whether the continuous power generation time of each of the power generation cells 2a to 2d is a set time T1 or longer. If it is not T1 or longer, the program is returned to the processing in Step S6 (see Step S8). Here, the set time T1 has been set based on changes over time in the output characteristics due to continuous power generation of the power generation cells 2a to 2d. In the present embodiment, the set time T1 has been set at 20 minutes. This set time T1 is preset in the timer of the controller 5.

9) The one of the power generation cells 2a to 2d having the lowest output voltage of the power generation cells 2a to 2d, which have been found to have a set time of T1 or more upon processing in Step S8, is detached from the series connection path. At the same time, any of the power generation cells 2a to 2d whose power generation has been brought to a halt is connected in series with the series connection path, and the time measuring action of the timer is reset, whereupon the program is returned to the processing in Step S6 (see Step S9).

10) If the processing in Step S7 shows the power consumption of the load 8 to be P2 or less, another one of the power generation cells 2a to 2d may be at rest. Thus, the one of the power generation cells 2a to 2d that has the lowest output voltage of the power generation cells 2a to 2d based on the voltage signals S02a to S02d is detached from the series connection path (see Step S10).

11) It is determined whether the power consumption of the load 8 computed by the controller 5 is P2 or more and, if the result of the computation is P2 or more, the program is returned to the processing in Step S3 (see Step S11).

12) If it is determined, upon processing in Step S11, that the power consumption of the load 8 is less than P2, it is further determined whether the power consumption of the load 8 computed by the controller 5 is P1 or less (see Step S12).

13) If the result of computation is not P1 or less upon processing in Step S12, it is determined whether the continuous power generation time of each of the power generation cells 2a to 2d is the set time T1 or longer. If it is not the set time T1 or longer, the program is returned to the processing in Step S11 (see Step S13).

14) If the processing in Step S13 determines that the continuous power generation time is the set time T1 or longer, all the power generation cells 2a to 2d are connected in series, and two of the power generation cells 2a to 2d which have low output voltages are detached from the series connection path. Also, the time measuring action of the timer is reset, whereupon the program is returned to the processing in Step S11 (see Step S14).

15) If the processing in Step S12 shows the power consumption of the load 8 to be P1 or less, still another one of the power generation cells 2a to 2d may be at rest (total three of them at rest). Thus, the one of the power generation cells 2a to 2d that has the lowest output voltage of the power generation cells 2a to 2d based on the voltage signals S02a to S02d is detached from the series connection path (see Step S15).

16) It is determined whether the power consumption of the load 8 computed by the controller 5 is P1 or more and, if the result of the computation is P1 or more, the program is returned to the processing in Step S3 (see Step S16).

17) If it is determined, upon processing in Step S16, that the power consumption of the load 8 is less than P1, it is determined whether the continuous power generation time of each of the power generation cells 2a to 2d is the set time T1 or longer (see Step S17).

18) If the processing in Step S17 determines that the continuous power generation time is the set time T1 or longer, the controller 5 connects all the power generation cells 2a to 2d in series, and detaches three of the power generation cells 2a to 2d having low output voltages from the series connection path. Also, the controller 5 resets the time measuring action of the timer, and returns the program to the processing in Step S16 (see Step S18).

19) If the processing in Step S17 determines that the continuous power generation time is less than the set time T1, it is determined whether the power consumption of the load 8 is zero (see Step S19). If it is not zero, the program is returned to the processing in Step S16, and the processings in the subsequent steps are repeated until the power consumption of the load 8 becomes zero. At a time when zero is reached, the switch 3 is brought to the OFF state to terminate the action of the power supply apparatus 1 (see Step S20).

Second Embodiment

Figure 3:
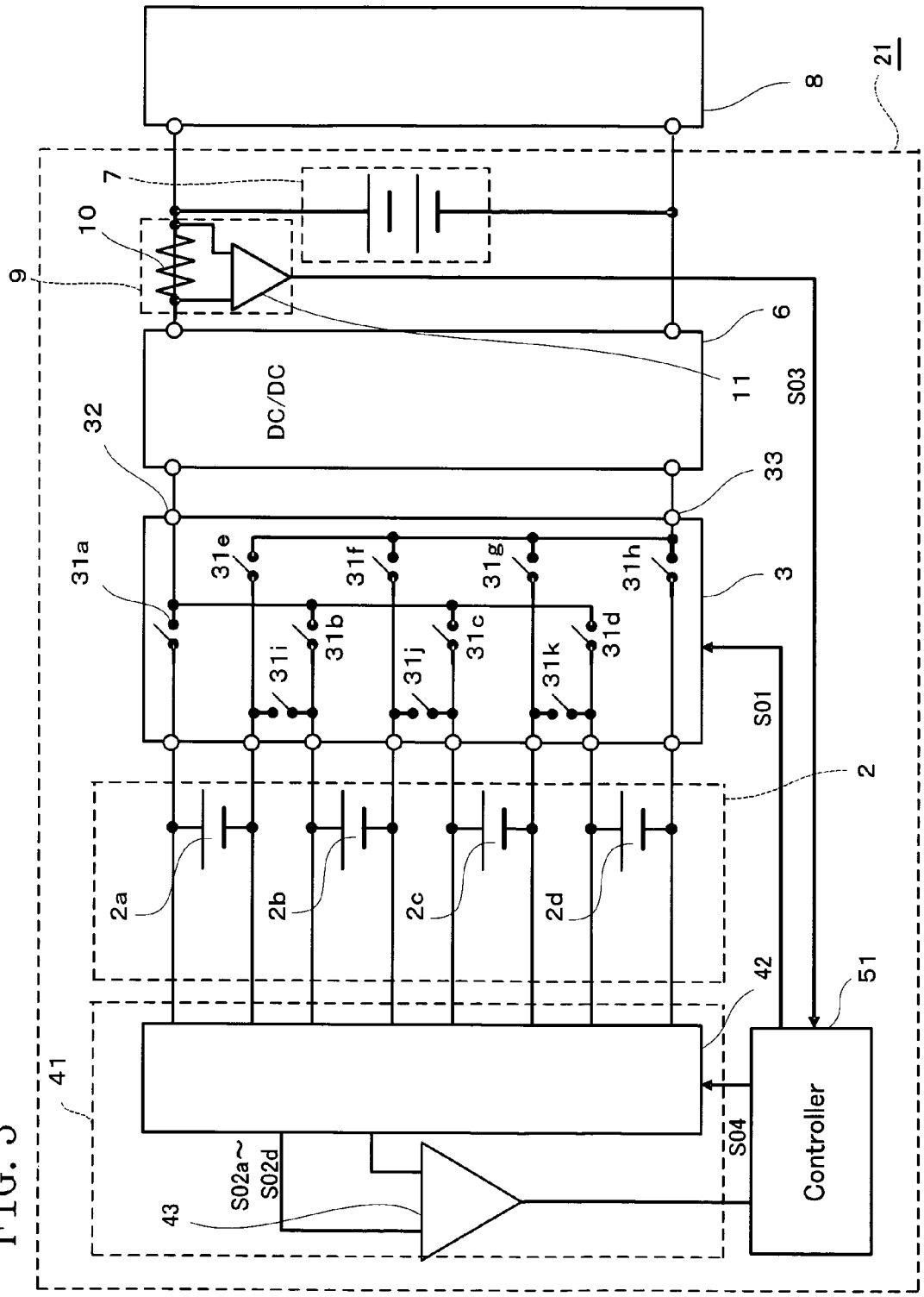
FIG. 3 is a block diagram showing a power supply apparatus according to a second embodiment of the present invention.
Figure 4:
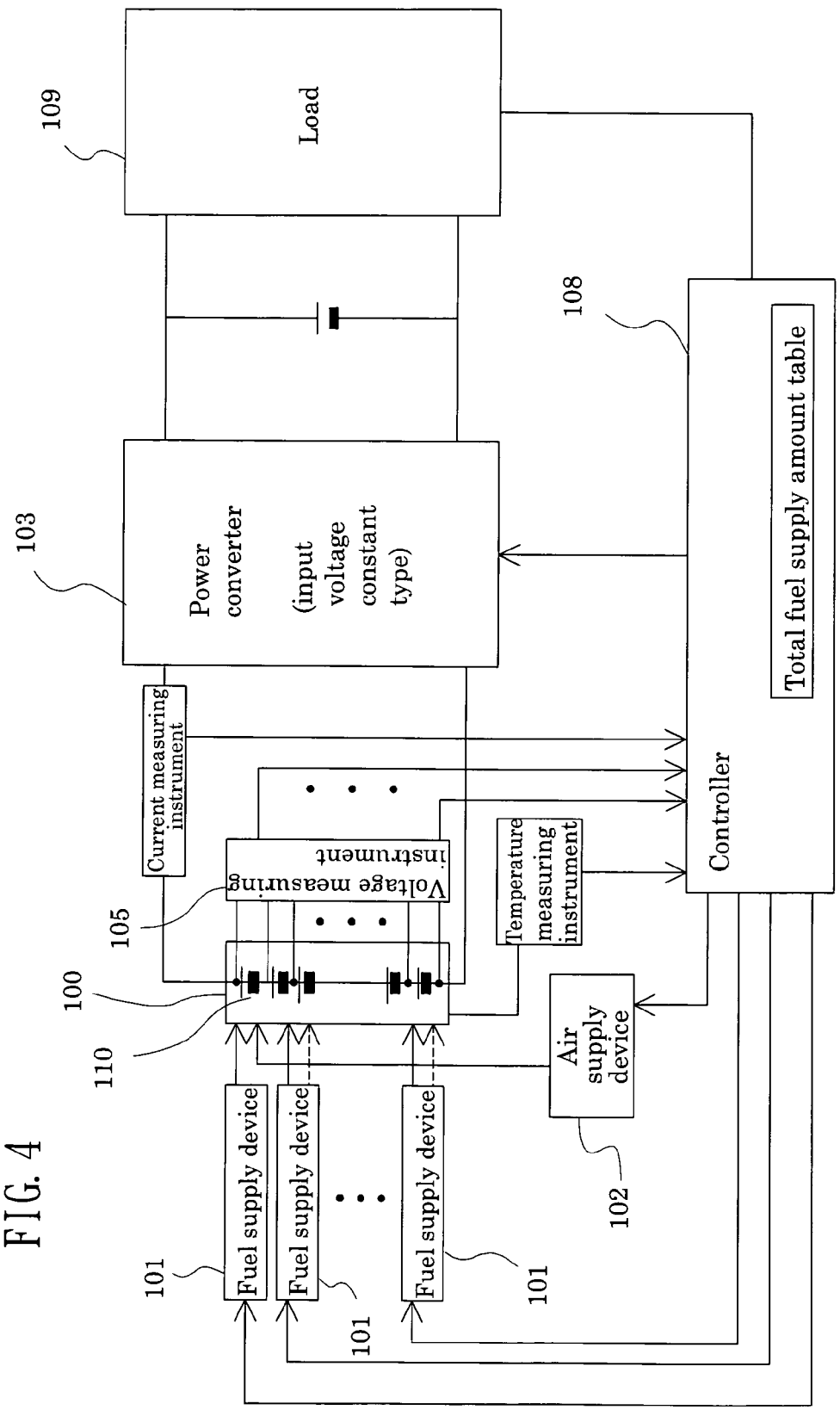
FIG. 4 is a block diagram showing a power supply apparatus according to the conventional technology.

FIG. 3 is a block diagram showing a power supply apparatus according to a second embodiment of the present invention. As shown in the drawing, a power supply apparatus 21 according to the present embodiment has the configuration of the voltage detector 4 modified to serve as a voltage detector 41. That is, the voltage detector 41 in the present embodiment has an analog multiplexer 42 connected to the output ports of a plurality of power generation cells 2a to 2d, and switches over time (scans) the power generation cells 2a to 2d whose voltages are to be detected. A voltage detecting amplifier 43 is connected to the output port of the analog multiplexer 42. Voltage signals S02a to S02d of the power generation cells 2a to 2d are sequentially supplied to a controller 5 via the voltage detecting amplifier 43. Control of scanning on this occasion is exercised by the controller 51 via a control signal S04. By the action of the controller 51, scanning of the power generation cells 2a to 2d having voltages detected is performed with cycles of 200 ms, and a delay time for voltage detection is set at 50 ms. The controller 51 has a program for controlling the above-described scanning action of the voltage detector 41, in addition to the program of the controller 5 in the First Embodiment.

Other features are the same as those of the power supply apparatus 1 according to the First Embodiment shown in FIG. 1. Thus, the same portions are assigned the same numerals as in the power supply apparatus 1, and duplicate explanations are omitted.

In the present embodiment as well, the controller 51 effects the control of the switch 3 and the output control of the power generation cells 2a to 2d in accordance with the procedure shown in FIG. 2.

The invention claimed is:

1. A power supply apparatus comprising:
a combined power source composed of a plurality of power cells configured electrically independently;
a switch connected to the combined power source and configured to arbitrarily change connection paths of the respective power cells by selectively connecting terminals of the plurality of power cells through switching elements;
a voltage detector configured to detect differences in electrical potentials between the terminals of the plurality of power cells;
an output detector configured to detect a power consumption in a load and/or an output power of the combined power source; and
a controller configured to (a) control ON-OFF states of the switching elements by controlling the switch by a control signal generated based on voltage signals representing the differences in electrical potentials detected by the voltage detector, a power consumption of the load, and an output power of the combined power source, and (b) control a connection status of each of the power cells via the switch so as to halt outputting of the power cell having the lowest output voltage or halt outputting of the plurality of power cells in order of increasing output voltage, when a continuous outputting time of any of the power cells becomes a predetermined time or longer, if it has been detected that a power value detected by the output detector is equal to or lower than an output power preset based on a power generating capacity of the combined power source, the predetermined time being preset in a timer of the controller based on changes over time in output characteristics of the combined power source due to continuous power generation of the power cells.

2. A power supply apparatus according to claim 1; wherein the controller is configured to control the connection status of each of the power cells via the switch so as to halt outputting of the power cell having the lowest output voltage.

3. A power supply apparatus according to claim 1; wherein the controller is configured to control the connection status of each of the power cells via the switch so as to halt outputting of the plurality of power cells in order of increasing output voltage.

4. A power supply apparatus according to claim 2; wherein the switch has first switching elements, whose number is equal to the number of the power cells, between the positive electrode of output ports of the switch and positive electrodes of the respective power cells; second switching elements, whose number is equal to the number of the power cells, between the negative electrode of the output ports of the switch and negative electrodes of the respective power cells; and third switching elements, whose number is smaller than the number of the power cells by one, between the power cells adjacent in a series direction of the power cells.

5. A power supply apparatus according to claim 2; further comprising a voltage regulator connected between the combined power source and the load and configured to stabilize a voltage supplied to the load; wherein the output detector detects the power consumption based on an output voltage of the voltage regulator and a load current supplied to the load.

6. A power supply apparatus according to claim 2; wherein the voltage detector is further configured to connect output ports of the respective power cells to a multiplexer, sequentially switch and scan the power cells, whose voltages are to be detected, by a control signal of the controller, and connect a voltage detecting instrument to an output port of the multiplexer to supply the voltage signals of the respective power cells sequentially to the controller.

7. A power supply apparatus according to claim 2; further comprising a voltage regulator connected between the combined power source and the load and configured to stabilize a voltage supplied to the load.

8. A power supply apparatus according to claim 3; wherein the switch has first switching elements, whose number is equal to the number of the power cells, between the positive electrode of output ports of the switch and positive electrodes of the respective power cells; second switching elements, whose number is equal to the number of the power cells, between the negative electrode of the output ports of the switch and negative electrodes of the respective power cells; and third switching elements, whose number is smaller than the number of the power cells by one, between the power cells adjacent in a series direction of the power cells.

9. A power supply apparatus according to claim 3; further comprising a voltage regulator connected between the combined power source and the load and configured to stabilize a voltage supplied to the load; wherein the output detector detects the power consumption based on an output voltage of the voltage regulator and a load current supplied to the load.

10. A power supply apparatus according to claim 3; wherein the voltage detector is further configured to connect output ports of the respective power cells to a multiplexer, sequentially switch and scan the power cells, whose voltages are to be detected, by a control signal of the controller, and connect a voltage detecting instrument to an output port of the multiplexer to supply the voltage signals of the respective power cells sequentially to the controller.

11. A power supply apparatus according to claim 3; further comprising a voltage regulator connected between the combined power source and the load and configured to stabilize a voltage supplied to the load.

* * * * *